(12) United States Patent
Eyer et al.

(10) Patent No.: US 8,984,441 B2
(45) Date of Patent: Mar. 17, 2015

(54) DYNAMIC UPDATE OF A USER INTERFACE BASED ON COLLECTED USER INTERACTIONS

(75) Inventors: Mark Eyer, Woodinville, WA (US); Peter Douma, Wyckoff, NJ (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 1006 days.

(21) Appl. No.: 11/952,079

(22) Filed: Dec. 6, 2007

(65) Prior Publication Data
US 2009/0150814 A1 Jun. 11, 2009

(51) Int. Cl.
*G06F 3/0482* (2013.01)
*G06F 9/44* (2006.01)
*G06F 3/0484* (2013.01)
*G06F 11/34* (2006.01)

(52) U.S. Cl.
CPC .......... *G06F 9/4443* (2013.01); *G06F 3/04842* (2013.01); *G06F 11/3476* (2013.01); *G06F 11/3438* (2013.01)
USPC ........... 715/811; 715/812; 715/813; 715/816; 704/3

(58) Field of Classification Search
USPC ............................... 715/811–813, 816; 704/3
See application file for complete search history.

(56) References Cited

U.S. PATENT DOCUMENTS

| | | | | |
|---|---|---|---|---|
| 5,261,042 A | * | 11/1993 | Brandt | 715/841 |
| 5,564,004 A | * | 10/1996 | Grossman et al. | 715/835 |
| 5,586,219 A | * | 12/1996 | Yufik | 706/14 |
| 5,802,492 A | * | 9/1998 | DeLorme et al. | 455/456.5 |
| 5,819,094 A | * | 10/1998 | Sato et al. | 717/131 |
| 5,916,310 A | * | 6/1999 | McCain | 710/67 |
| 6,307,549 B1 | * | 10/2001 | King et al. | 715/810 |
| 6,377,286 B1 | * | 4/2002 | Hochmuth | 715/810 |
| 6,662,225 B1 | | 12/2003 | Motoyama et al. | |

(Continued)

FOREIGN PATENT DOCUMENTS

| | | | | |
|---|---|---|---|---|
| EP | 891066 A2 | * | 1/1999 | H04M 1/00 |
| EP | 1091522 | | 4/2001 | |

(Continued)

OTHER PUBLICATIONS

Clayton Lewis and John Rieman, Task-Centered User Interface Design A Practical Introduction, 1994, Chapter 4.*

(Continued)

*Primary Examiner* — Tuyetlien Tran
*Assistant Examiner* — David S Posigian
(74) *Attorney, Agent, or Firm* — Trellis IP Law Group, PC (57) ABSTRACT

While a user is using the electronic device, user interaction information for keystrokes, button pushes, and activation of functional controls may be recorded. The user interaction information is stored and when the electronic device is connected to a network, the user interaction information is sent over the network to a user interface analyzer. The user interface analyzer analyzes the user interaction information to determine patterns of usage regarding a hierarchy of menu items for the user interface. The analysis may show that a user interface may be improved for better usability. The user interface on the electronic device may be dynamically changed to alter the menu hierarchy, or the analysis may be used to improve future generations of products. For example, menu items may be positioned such that the user can more easily access menu items that are used more frequently.

15 Claims, 7 Drawing Sheets

(56) References Cited

U.S. PATENT DOCUMENTS

| | | | |
|---|---|---|---|
| 7,769,805 B1* | 8/2010 | Barnes et al. | 709/203 |
| 2002/0044149 A1 | 4/2002 | McCarthy et al. | |
| 2003/0076305 A1 | 4/2003 | Allen | |
| 2003/0090515 A1* | 5/2003 | Chang et al. | 345/745 |
| 2003/0105924 A1 | 6/2003 | Spencer et al. | |
| 2003/0159088 A1* | 8/2003 | Phillips et al. | 714/38 |
| 2003/0194017 A1* | 10/2003 | Woodworth | 375/286 |
| 2003/0225730 A1* | 12/2003 | Warner et al. | 707/1 |
| 2004/0056789 A1* | 3/2004 | Arling et al. | 341/176 |
| 2005/0043978 A1 | 2/2005 | Chainer et al. | |
| 2005/0060719 A1* | 3/2005 | Gray et al. | 719/318 |
| 2005/0266866 A1* | 12/2005 | Ahya et al. | 455/502 |
| 2006/0107219 A1* | 5/2006 | Ahya et al. | 715/745 |
| 2006/0184379 A1 | 8/2006 | Tan et al. | |
| 2006/0200253 A1* | 9/2006 | Hoffberg et al. | 700/19 |
| 2007/0006036 A1* | 1/2007 | Devas et al. | 714/38 |
| 2007/0067373 A1* | 3/2007 | Higgins et al. | 707/206 |
| 2007/0108946 A1 | 5/2007 | Yamauchi et al. | |

FOREIGN PATENT DOCUMENTS

| | | |
|---|---|---|
| WO | WO0062087 | 10/2000 |
| WO | WO0221741 | 3/2002 |
| WO | WO2007074535 | 7/2007 |

OTHER PUBLICATIONS

Lane et al., Predicting the Skilled Use of Hierarchical Menus With the Keystroke-Level Model, Human-Computer Interaction, 1993, vol. 8, pp. 185-192.*

Kent L. Norman, Predicting the Skilled Use of Hierarchical Menus With the Keystroke-Level Model, Ablex Publishing Corporation1991.*

* cited by examiner

DYNAMIC UPDATE OF A USER INTERFACE BASED ON COLLECTED USER INTERACTIONS

BACKGROUND

Particular embodiments generally relate to electronic devices and more specifically to user interface analysis.

Consumer electronic devices have become more complicated with the addition of more and more functions. It is hard for a user to understand how to use all the functions of a device. Also, with the additional functions, user interfaces have become more complicated and include a deep hierarchy of menu items. It becomes even harder to use the user interface when many keystrokes are needed to navigate the hierarchy of menu items to find a menu item to trigger the function. In some cases, the menu item to activate a function is hard to find and requires the user to go down many branches of the menu hierarchy to actually find the menu item and activate the function. This may cause a user to become frustrated with the device and may also cause a user to not fully use all the functions offered by a device.

SUMMARY

Particular embodiments analyze user interaction with a user interface of an electronic device to dynamically configure the user interface. While a user is using the electronic device, user interaction in the form of keystrokes performed or buttons pressed may be recorded. For example, information on when a key, button, or switch was activated and/or released may be stored. Also, functional state that was triggered may be recorded before the keystroke or button push and after the keystroke or button push. The user interaction information is stored and when the electronic device is connected to a network, the user interaction information is sent over the network to a user interface analyzer. The user interface analyzer analyzes the user interaction information to determine patterns of usage regarding a hierarchy of menu items for the user interface. For example, the user interface analyzer may analyze sequences of keystrokes to determine when a user navigated down a hierarchy of menu items and did not find a function that was desired. This may be determined by noting cases where the user navigated down the hierarchy and then navigated up again without selecting a desired function. Such a sequence may denote an unsuccessful search for a function. A case may be noted when the user, after navigating up the hierarchy, navigated back down and selected a function. The menu item that the user is determined to be looking for may then be determined. The result of the analysis may be that the user interface may be changed to improve usability. In some cases, the user interface on the electronic device may be dynamically changed, by a code download to update the product, to alter the menu hierarchy, or the interface is changed on future products. For example, menu items may be repositioned such that the user can more easily access menu items that are used more frequently.

A further understanding of the nature and the advantages of particular embodiments disclosed herein may be realized by reference to the remaining portions of the specification and to the attached drawings.

DETAILED DESCRIPTION OF EMBODIMENTS

Figure 1:
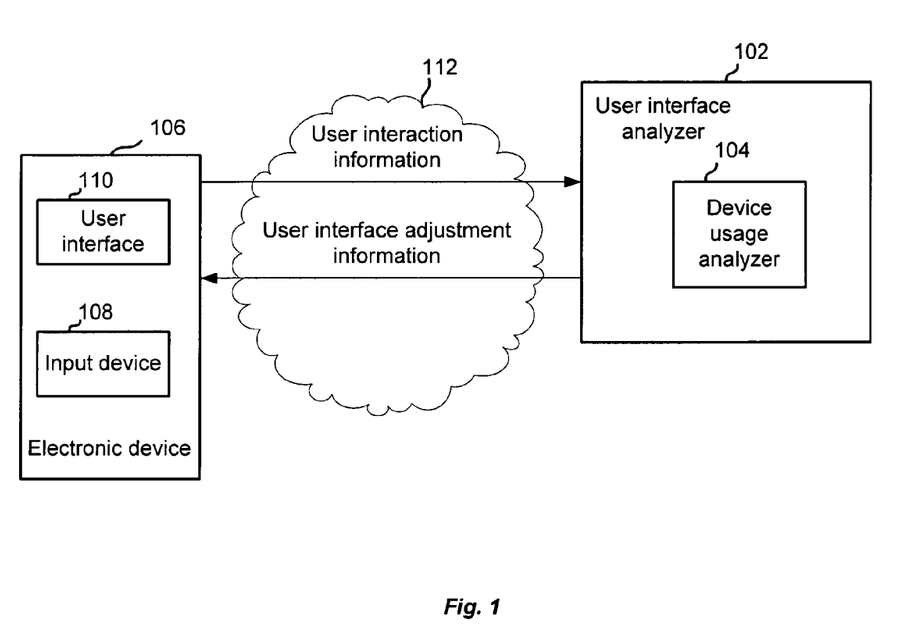
FIG. 1 depicts an example of a system for analyzing a user interface according to one embodiment.

FIG. 1 depicts an example of a system 100 for analyzing a user interface according to one embodiment. As shown, a user interface analyzer 102 and an electronic device 106 are provided.

Electronic device 106 may be any consumer or commercial electronic product that includes a user interface. For example, electronic device 106 may be a consumer electronic device such as a cordless telephone answering machine, digital camera, digital music player, or digital video recorder. Electronic device may also be a computing device running software, such as a personal computer running a software program, such as a music player, word processor, etc.

Interface 110 may include a screen that displays menu items to a user. Electronic device 106 may include input device 108 that a user can use to navigate a hierarchy of menu items. Input device 108 may include physical keys that can be actuated, such as soft keys, a keyboard, function buttons, dials or switches, etc. Also, input device 108 may include a touch screen that may be used to activate virtual keys displayed on the screen.

In some types of electronic devices, a hierarchy of menu items may be provided. This hierarchy may be a tree-like structure where when one menu items is selected, additional items may be displayed on interface 110. For example, a menu of six items may be displayed on interface 110. When one menu item is selected, by using for example arrow and "select" keys, a touch screen, or a soft key, an additional number of menu items may be displayed. The hierarchy of menu items may extend deeper as the user selects additional menu items. Eventually, there will come a point in the hierarchy where a user cannot navigate down the menu hierarchy any further. Thus, only a portion of the menu hierarchy may be displayed at one time, requiring multiple keystrokes to navigate to lower levels of the hierarchy.

The menu items may allow the user to navigate the hierarchy to find a menu item for a function that is offered by the electronic device 102. A function may be any control, feature, or any action that is offered by the electronic device. For example, a function may include adding an entry to an address book, making a phone call, activating a camera on a cellular phone, etc. Some menu items may open additional menu items. This may be considered performing a function also as the function is to open more menu items.

When the user navigates the menu hierarchy, user interaction information may be recorded. The user interaction information may be any information associated with the user using interface 110. For example, the keystrokes selected may be recorded. Keystrokes may be any action taken to navigate to or activate a function. For example, operation of controls such as mouse, scroll wheels, sliders, dials, etc. may include keystrokes. Also, a keystroke may be when a key (virtual or hard) is pressed and later released. The starting and ending times of when a key is pressed and released may be recorded along with which key was pressed in memory. Also, any functions or controls that were adjusted may also be stored. This may all be referred to as user interaction information. Also, other information pertaining to the user's operation of the product may be recorded, for example the amount of time the device is typically powered up between battery charges, the percentage of time a certain operational mode is used compared to other modes, how long it takes the user to perform certain functions, how often (and under what conditions) error conditions occur, what percentage of users have selected the maximum or minimum allowed value in a range, etc.

When electronic device 106 is connected to a network 112, the user interaction information may be automatically uploaded, without user intervention, to user interface analyzer 102. Network 112 may include a wired or wireless local area network (LAN) offering Internet access, a wide area network (WAN), etc. Electronic devices 106 may be able to connect to the Internet and thus at times, the user interaction information may be uploaded to user interface analyzer 102. Although user interface analyzer 102 is shown as being remote from device 106, the functions performed by user interface analyzer 102 may be distributed within device 106 and/or another device.

User interface analyzer 102 includes a device usage analyzer 104 that is configured to analyze the user interaction information. The user interaction information may be examined to determine how a user is actually interacting with the user interface. For example, a user may be using more keystrokes to trigger certain functions than are needed to trigger the function. As another example, the analysis may show that desirable functions may not be easy for a user to find in the menu hierarchy and may be causing users to go down the menu hierarchy, not find the function, and causing users to have to go back up the menu hierarchy and down a different path to find the function. Device usage analyzer 104 may analyze the keystrokes to determine menu items that a user may have been searching for and could not find to trigger a function. The analysis may be used to design future generations of the user interface. In one example, the analysis may be reviewed by design engineers to determine if the interface should be changed.

Device usage analyzer 104 may send user interface adjustment information to electronic device 106. This may cause the hierarchy of menu items in electronic device 106 to be adjusted. For example, menu items may be changed to different locations on the hierarchy depending on the user interaction information.

Figure 2:
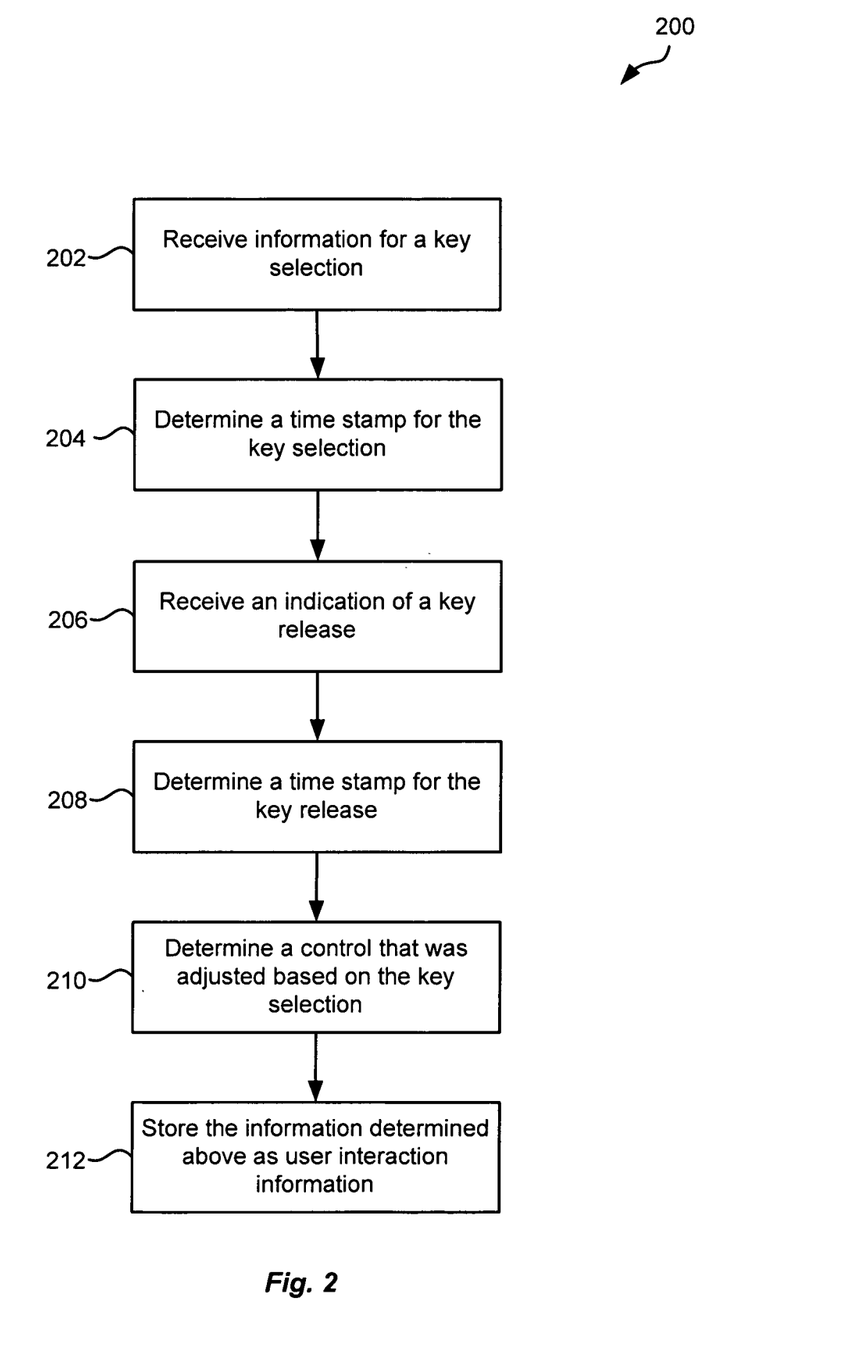
FIG. 2 depicts a simplified flowchart of a method for collecting user interaction information at an electronic device according to one embodiment.

The following describes the collection of user interaction information and its analysis, and then the reconfiguration of a user interface in more detail. FIG. 2 depicts a simplified flowchart 200 of a method for collecting user interaction information at electronic device 106 according to one embodiment. Step 202 receives information for a function selection or activation. For example, a virtual or hard key may be selected by a user and may include the press of an alphanumeric key on a keyboard, a soft key, a key on a touch screen, etc. Thus, any way of selecting a function may be used. In one embodiment, not all key presses are stored. For example, key presses that are directed towards activating functions or menu items may be stored. However, if a user is typing a text message, e-mail, or performing any other action that does not involve navigation of menu hierarchy, user interaction information may not be collected. This may ensure that a user's privacy is protected, and avoids storing irrelevant information.

Step 204 determines a time stamp for the function selection. The time stamp may include the time the key was selected or if a sequence of keys is being recorded, the number in the sequence that the key has been selected. For example, within a ten second span, a sequence of keystrokes may be recorded and numbered in sequence. After a period of inactivity, the sequence of keystrokes may start over at zero.

Step 206 receives an indication of a function release. For example, the user may select a key and release it immediately. Also, there may be keys where the user may have to select a key and hold it down for a period of time.

Step 208 then determines a time stamp for the function release. Although the recording of a key selection and key release is described, it will be understood that variations of user interaction information may be appreciated. For example, when a key is pressed, it may be the only user interaction information that is recorded in addition to the time the key was pressed instead of collecting any key release information.

Step 210 determines a function that was triggered based on the key selection. For example, a function may be activated or de-activated by the sequence of keystrokes determined above. Any change in value may be recorded, such as the change in screen brightness, etc.

Step 212 then stores the information determined above as user interaction information. It should be noted that the user interaction information may not include all the information described in steps 202-210 above. For example, the user interaction information may include the key presses but not the key releases and functions that were adjusted.

Figure 3:
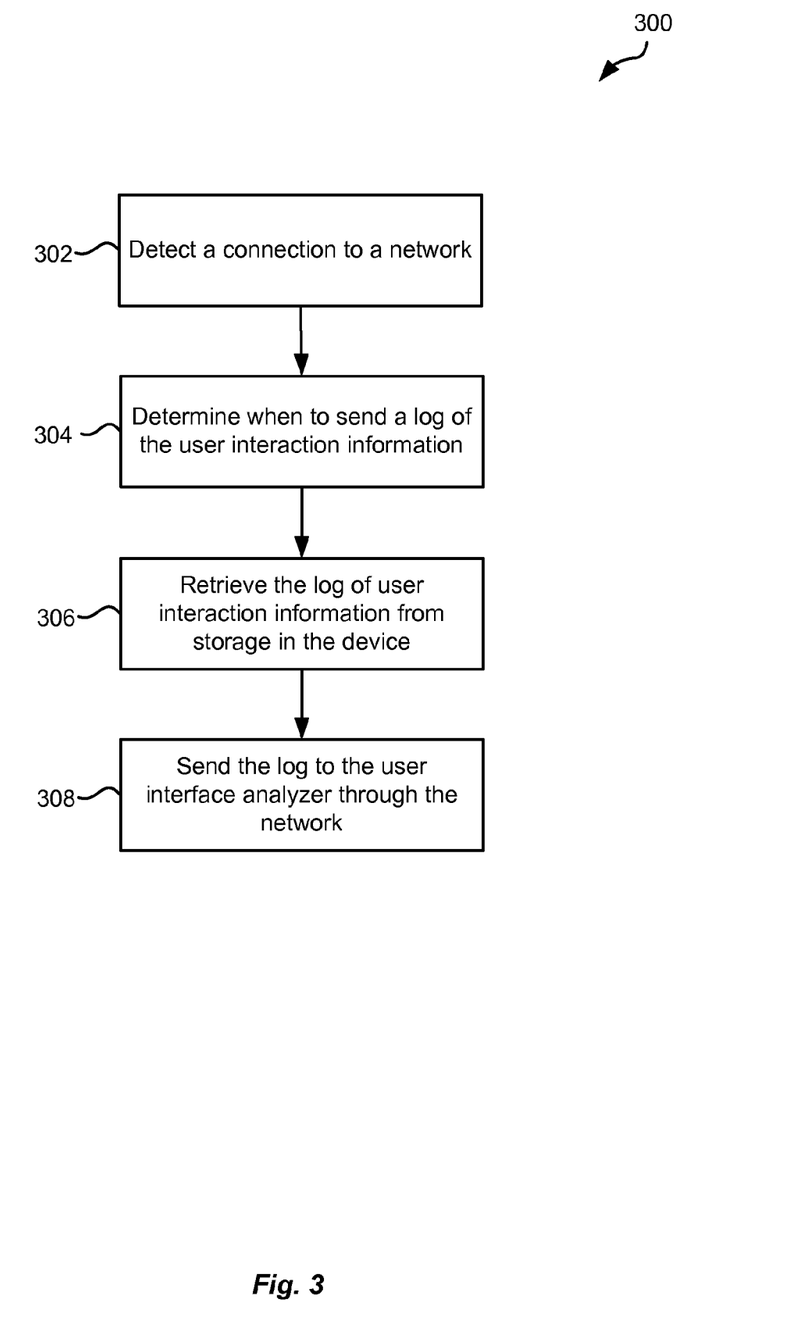
FIG. 3 depicts an example of a flowchart for sending user interaction information to a user interface analyzer according to one embodiment.

Once the user interaction information is collected, it may be stored in device 106 for later sending to user interface analyzer. FIG. 3 depicts an example of a flowchart 300 for sending user interaction information to user interface analyzer 102 according to one embodiment. Step 302 detects a connection to a network. For example, electronic devices 106 may connect to the Internet, a local area network (LAN), a wide area network (WAN), or any other network. In one embodiment, electronic device 106 may be indirectly connected to a network through another device. For example, the user may sync electronic device 106 with an intermediary device connected to the Internet. The intermediary device may then send the user interaction information to user interface analyzer 102. Also, electronic device 106 may be continuously connected to the network, such as a cellular phone may be connected to a wireless network, and may send the user interaction information at any time.

Step 304 determines when to send a log of the user interaction information. For example, user interaction information may be sent at certain intervals so as not to unnecessarily use bandwidth or processing power of the network and/or electronic device.

Step 306 retrieves the log of user interaction information from storage in device 106. Step 308 then sends the log to user interface analyzer 102 through the network. The log may then be cleared in device 106 and additional user interaction information may be stored. Also, a continuous log may be kept and cleared at certain times or until a user clears the log.

Figure 4:
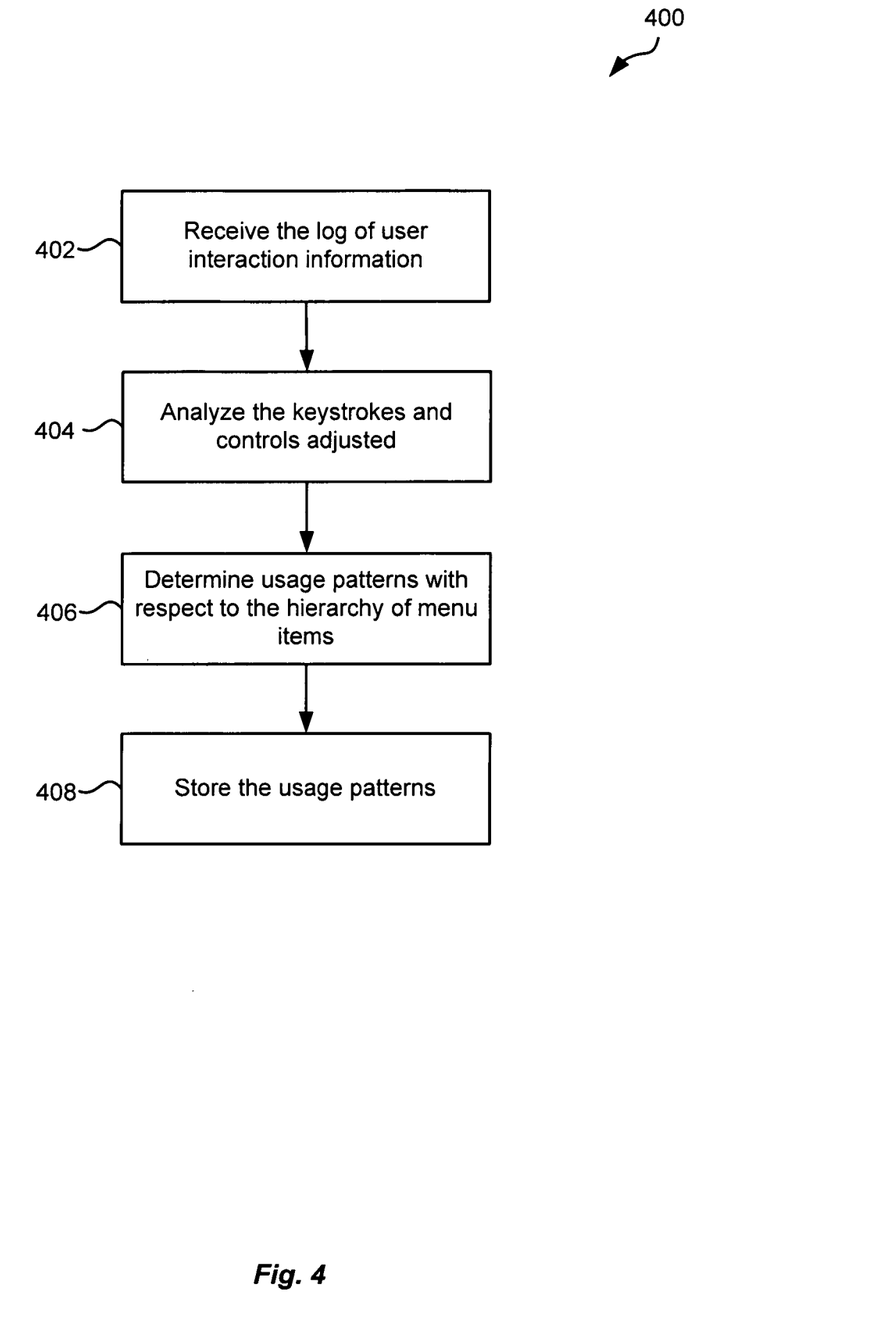
FIG. 4 depicts a flowchart for analyzing the user interaction information according to one embodiment.

Once receiving the user interaction information, device usage analyzer may analyze the information. FIG. 4 depicts a flowchart 400 for analyzing the user interaction information according to one embodiment. In step 402, device usage analyzer 104 receives the log of user interaction information. In step 404, device usage analyzer 104 analyzes the keystrokes and functions adjusted. The analysis may be to determine how the hierarchy of menu items was used.

In step 406, device usage analyzer 106 determines usage patterns with respect to the hierarchy of menu items. For example, what functions were used, how many keystrokes were needed to trigger the function, etc. may be determined. Also, the usage patterns for many different devices may be analyzed to determine how the user interface was used. For example, many devices may have the same menu hierarchy. How different users navigated the hierarchy of menu items may thus be analyzed. The usage patterns may be used to determine which functions were easy to find, which functions required additional keystrokes to find, etc.

Step 408 then stores the usage patterns. Also, usage patterns may be output. For example, the usage patterns may be output and displayed for analysis by a design engineer. Through various interactions with the device usage analyzer, members of the design engineering team may discover trends, look at statistics, or learn other important information about how users are interacting with the product.

Figure 5:
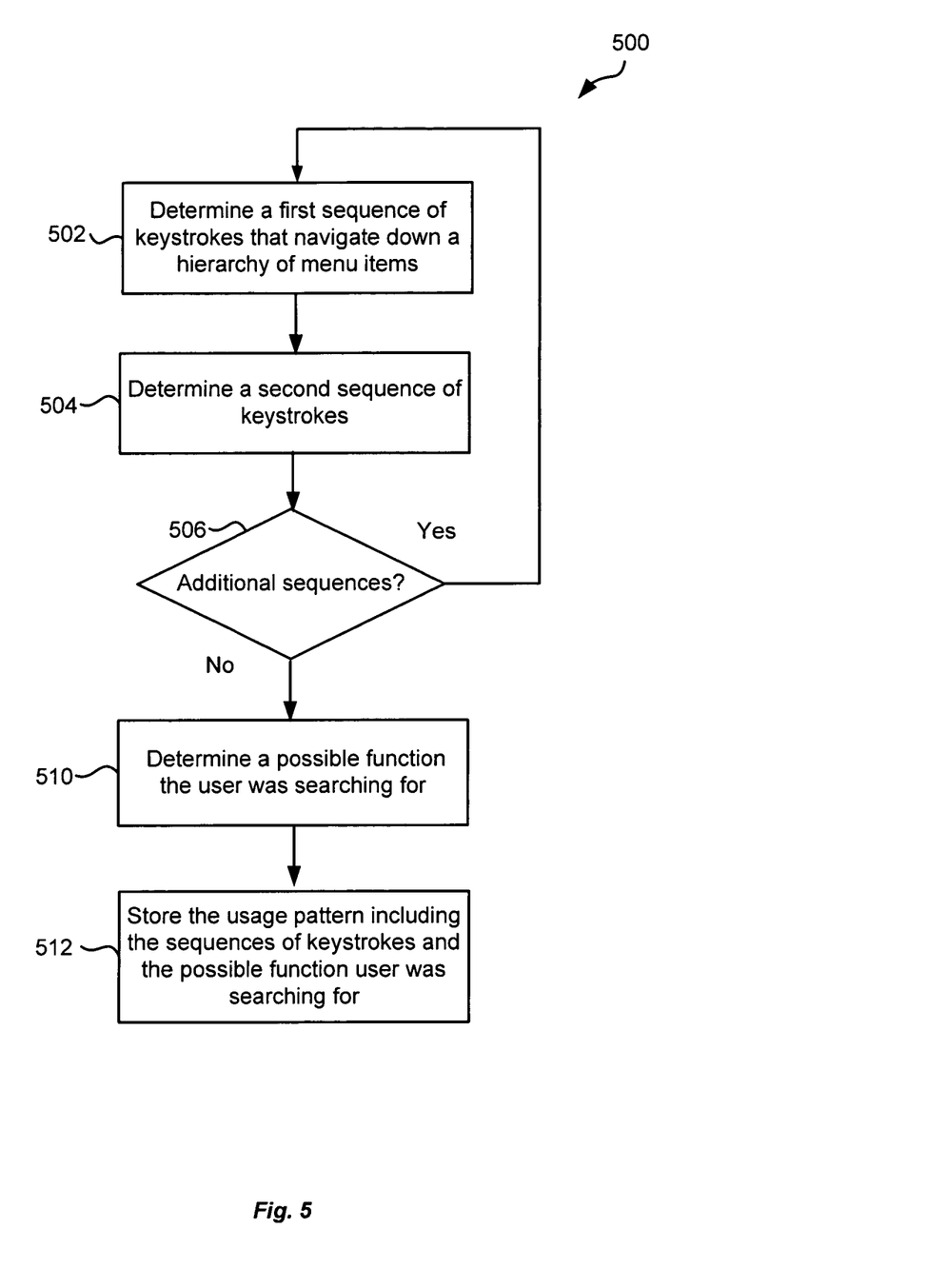
FIG. 5 depicts a simplified flowchart of a method for analyzing user interaction information according to one embodiment.

A more detailed example of an analysis of the user interaction information will now be described. FIG. 5 depicts a simplified flowchart 500 of a method for analyzing user interaction information according to one embodiment. For example, the usage patterns may be analyzed. Step 502 determines a first sequence of keystrokes in the usage patterns that navigate down a hierarchy of menu items. For example, a user may first select a menu item on a first level of a hierarchy. A second level is then displayed that may include an additional number of menu items. The user may select another menu item in the second level and be presented with yet another number of menu items. This process may continue as a user navigates down a menu hierarchy. The sequence of keystrokes determined may be a sequence of consecutive keystrokes. For example, the recorded time stamps may be used to determine when consecutive keystrokes are recorded in a sequence. If a user selects a menu item and then within a set time period (e.g., a couple of seconds), another menu item is selected, this may be considered a consecutive sequence of keystrokes. However, if a user selects a menu item and does not select another menu item for another 30 minutes or there is a timeout (i.e., the user interface resets to the top level of the menu hierarchy), then the next keystroke that is recorded may not be considered part of the sequence of keystrokes.

Step 504 determines a second sequence of keystrokes. The second sequence of keystrokes may include at least one keystroke that backs out of the current position of the menu hierarchy without selecting a function. For example, the user may navigate down the menu hierarchy but may decide that the function that is desired is not found in this branch of the menu hierarchy. Thus, the user may go up the menu hierarchy. Also, the user may back out of the menu hierarchy totally by selecting a button such as a stop button that may automatically reset the menu hierarchy to the top level.

Step 506 determines whether or not an additional sequence of keystrokes was recorded. For example, when the user backs out of the menu hierarchy, the user may go back down another branch of the menu hierarchy. Thus, the process may reiterate to step 502 and/or 504 to determine additional sequences of keystrokes. This process may continue as a user is searching for a control that he/she wants to adjust.

When all the sequences of keystrokes have ended (i.e., a function was selected or no function was selected after a time period), step 508 determines a possible function the user was searching for. For example, after a consecutive sequence of keystrokes that go down a branch of a menu hierarchy, up the branch and back down another branch to where a function is finally selected, the function selected may be determined as the function that the user was searching for. In this case, the usage pattern suggests that the user had to go down a first branch, then back up and then down another branch to actually find a menu item for the function.

Step 510 stores the usage pattern including the sequences of keystrokes and the possible function user was searching for. Also, the usage pattern may be output for the user to view.

The above process may be used to analyze which controls a user may or may not have found to be hard to find. For example, usage patterns that show that a user navigated down a menu hierarchy, back up, and down another branch of the menu hierarchy to select a function may indicate that the user did not find the function in the minimum amount of keystrokes needed. Other patterns may also indicate that extra keystrokes were used to find a function. In some cases, analysis may show that after a series of keystrokes, no function was ultimately selected, perhaps indicating that a function was sought without success.

This information may allow user interface 110 on electronic device 106 to be reconfigured. For example, depending on how a user uses electronic device 106, the menu items may be adjusted such that they may be accessed more easily by the user. Analysis of usage patterns for a large population of users may reveal information that can be valuable in designing the next generation of a product. In addition to improving accessibility to more frequently-used functions, the analysis may show that certain functions are almost never used (and hence may be dropped in future products), or that certain functions are misunderstood (usage patterns indicate that users un-do the action shortly after selecting it). Appropriate changes can be made to future versions of the product, or to the existing product if it is able to be field-upgraded by code download.

Figure 6:
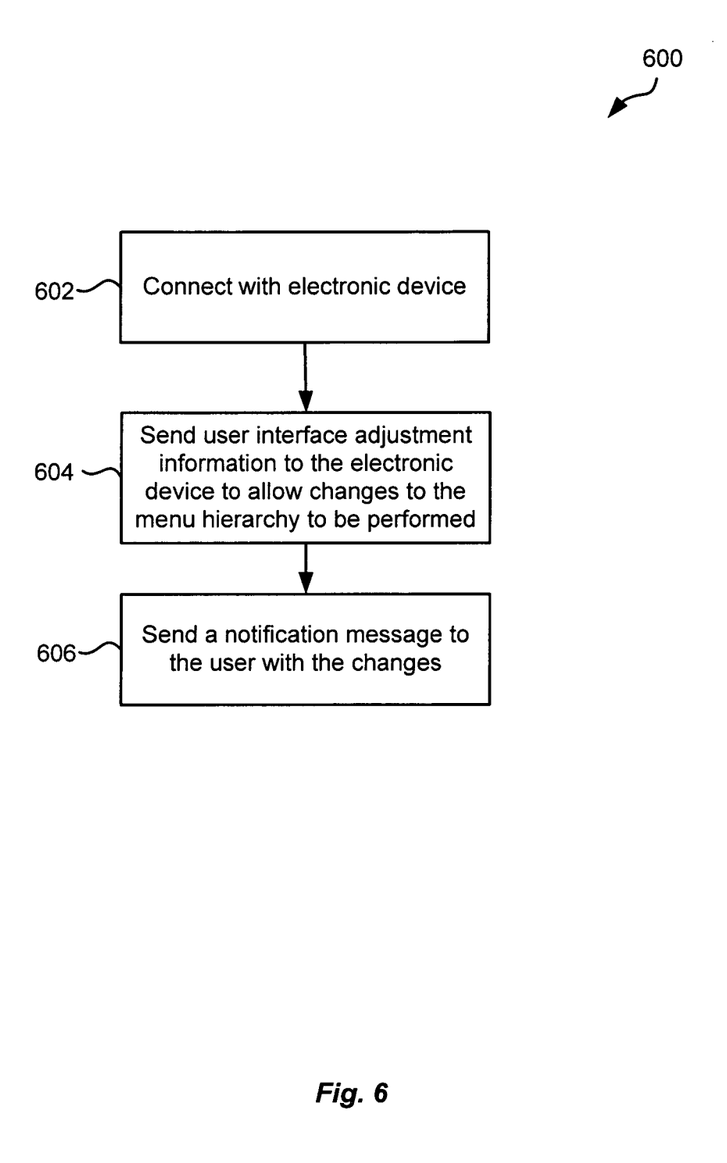
FIG. 6 depicts a simplified flowchart of a method for dynamically reconfiguring a user interface according to one embodiment.

FIG. 6 depicts a simplified flowchart 600 of a method for dynamically reconfiguring a user interface according to one embodiment. Step 602 connects with electronic device 106. For example, user interface analyzer 102 may connect with electronic device 106 through an Internet connection. Also, an intermediary device may be used to connect with electronic device 106, such as when a computer is used to connect with a portable music player.

Step 604 sends user interface adjustment information, which may be in the form of a code update or revision, to electronic device 106 to effect changes to the menu hierarchy. For example, the information may include the menu items that are to be adjusted to different positions in the menu hierarchy. This may cause electronic device 106 to reconfigure its user interface automatically.

Step 606 then sends a notification message to the user with the changes. For example, because the user interface is being changed, notifying the user that this change is being performed allows the user to know where controls have been repositioned. Also, this may give the user the choice of accepting or rejecting the changes to the user interface. For example, the user, once they have found the control, may like where it is situated. However, in some cases, the changes are to allow the user to expend fewer keystrokes to actually find a control.

Also, in other embodiments, the user interface adjustment information may be used to alter user interfaces on other devices. For example, user interface adjustment information for a PDA may be used to alter the user information for the user's cell phone. Further, the user interface adjustment information may be used to alter user interfaces for entirely different users. Analysis of the patterns of behavior of a number of users may result in the decision to revise the user interface for all users the next time the device is connected to the network.

Figure 7:
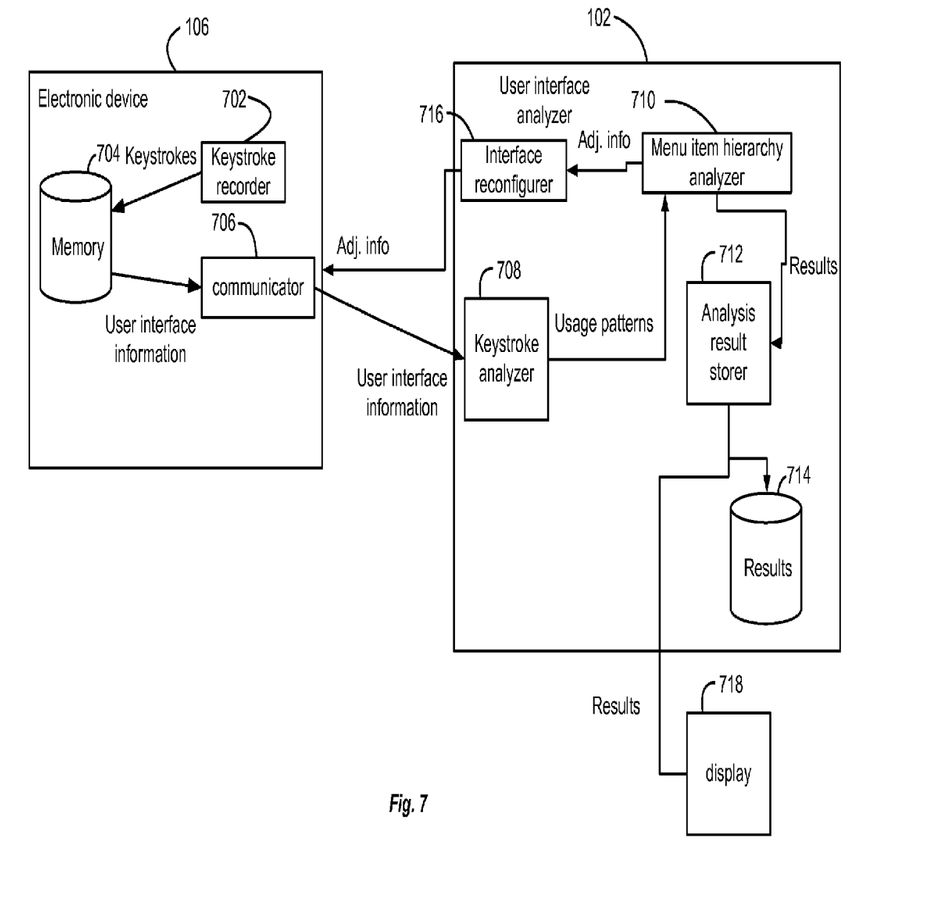
FIG. 7 depicts a more detailed example of the system according to one embodiment.

FIG. 7 depicts a more detailed example of system 100 according to one embodiment. As shown, electronic device 106 includes a keystroke recorder 702, a memory 704, and a communicator 706.

Keystroke recorder 702 may record key presses and associate a time each key was pressed and released. Also, keystroke recorder 702 may record the starting and ending values of controls that were adjusted. For example, if the brightness of a screen is being adjusted, the keystrokes to navigate to the menu item to change the screen brightness are recorded and also the value of the screen brightness before and after the function is adjusted is determined.

Keystroke recorder 702 then stores the user interaction information in memory 704. For example, memory 704 may include non-volatile random access memory (NVRAM). Also, memory 704 may include read-only memory (ROM), flash memory, hard disk, or any other kind of storage.

Communicator 706 is configured to send the user interaction information to user interface analyzer 102. For example, when electronic device 106 is connected to a network, communicator 706 retrieves the user interaction information from memory 704 and sends it to keystroke analyzer 708 of user interface analyzer 102. Keystroke analyzer 708 is configured to analyze keystrokes to determine usage patterns as was described above.

A menu item hierarchy analyzer 710 determines controls that a user may have been attempting to navigate to but used extra keystrokes to navigate there. This may include navigating down a branch of the hierarchy and back up the branch of the hierarchy and finally back down another branch to find the control.

An analysis results storer 712 is then configured to store the analysis results in storage 714. The results may later be used to reconfigure a user interface using interface reconfigurer 716. For example, interface reconfigurer 716 may communicate with electronic device 106 to cause electronic device 106 to reconfigure a menu hierarchy of the user interface. Also, the analysis results may be displayed on a display 718 for analysis. For example, an interface designer may review the analysis results to determine if current or future generations of the interface should be reconfigured. Also, the analysis results may be analyzed to determine if the user interface should be dynamically reconfigured on electronic device 106.

Accordingly, particular embodiments record user interaction information as a user is using electronic device 106. Usage patterns are determined that indicate how the device is used and how a menu item hierarchy is navigated to adjust controls. This information is then used to reconfigure the user interface.

Although the description has been described with respect to particular embodiments thereof, these particular embodiments are merely illustrative, and not restrictive. Although keystrokes are described, it will be understood that other usage information may be used, such as which content is downloaded, etc. For example, if a large number of MP3 files are downloaded, the user interface may be reconfigured so that media player controls are at the top of a menu hierarchy.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory. Particular embodiments can be implemented in the form of control logic in software or hardware, or a combination of both software and hardware. The control logic, when executed by one or more processors, may be operable to perform that which is described in particular embodiments.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for analyzing use of a user interface, the method comprising:

determining user interaction information at an electronic device while a user is
using the electronic device, the determining occurring independently of whether the device is connected to a network;

storing a log of the determined user interaction information in the electronic device;

after a connection between the electronic device and a network is detected, transmitting the stored log over the network to a user interface analyzer;

analyzing the user interaction information at the user interface analyzer to determine patterns of usage regarding navigating a hierarchy of menu items in the user interface of the electronic device by identifying multiple keystrokes and ascertaining whether the multiple key strokes are associated with a common keystroke sequence, wherein the hierarchy of menu items comprises first and second branches of menu items;

determining, at the user interface analyzer, a possible function that the user was searching for, the determining of the possible function being based on the analysis of the user interaction information revealing that during a navigation of the first branch of menu items, the user did not select any menu item triggering the possible function, and that during a subsequent navigation of the second branch of menu items, the user did select one menu item in the hierarchy of menu items, the selected item triggering the possible function;

storing an analysis result for the determination of the possible function at the user interface analyzer; and using the stored analysis result to change the hierarchy of menu items to facilitate selection of the menu item triggering the possible function, wherein the user interface analyzer sends interface adjustment information to the electronic device over the network to allow the electronic device to change the hierarchy of menu items based on the stored analysis result by changing a location of the menu item triggering the possible function from the second branch of the menu items to the first branch of menu items based on the interface adjustment information.

2. The method of claim 1, wherein the analyzing comprises:

identifying that a first group of the multiple keystrokes occurred during a period of time, defining a first sequence of keystrokes, and that a second group of the multiple keystrokes occurred outside of the period of time, defining a second sequence of keystrokes;

determining the first sequence of keystrokes down the hierarchy of menu items; and determining the second sequence of keystrokes, wherein at least one keystroke in the second sequence is up the hierarchy of menu items, wherein the possible function is determined based on the first sequence and the second sequence.

3. The method of claim 2, wherein one or more time stamps as to when keystrokes in at least one of the first sequence and the second sequence occur are used to determine if the user was looking for the possible function.

4. The method of claim 1, wherein the possible function is offered by the electronic device.

5. The method of claim 1, further comprising sending a notification message to the user to indicate that the hierarchy of menu items is to be changed.

6. A method for analyzing use of a user interface of an electronic device, the method comprising:

determining, at the electronic device, user inputs for the user interface while a user is using the electronic device, the determining occurring independently of whether the device is connected to a network;

storing a log of the determined user interaction information in the electronic device based on the user inputs;

after a connection between the electronic device and a network is detected, transmitting the stored log over the network to a user interface analyzer to allow the user interface analyzer to analyze the user interaction information to determine patterns of usage regarding navigating a hierarchy of menu items for the user interface of the electronic device by identifying multiple keystrokes and ascertaining whether the multiple key strokes are associated with a common sequence, wherein the hierarchy of menu items comprises first and second branches of menu items;

receiving, at the electronic device, user interface adjustment information sent over the network from the user interface analyzer; and adjusting a location of a menu item in the hierarchy of menu items from the second branch to the first branch based on the user interface adjustment information, wherein selection of a possible function that the user was searching for, prior to the adjusting, during a navigation of the first branch of menu items is facilitated by the adjustment of the menu item, wherein the possible function is determined by the analysis of the user interaction information by the user interface analyzer revealing that during the navigation of the first branch of menu items, the user did not select any menu item triggering the possible function, and that during a subsequent navigation of the second branch of menu items, the user did select one menu item in the hierarchy of menu items, the selected item triggering the possible function.

7. The method of claim 6, wherein the user interaction information comprises information for at least one of a first sequence of keystrokes down the hierarchy of menu items and a second sequence of keystrokes, wherein at least one keystroke in the second sequence is up the hierarchy of menu items.

8. The method of claim 6, wherein the interface adjustment information is used by the electronic device to changes a location of a menu item in the hierarchy of menu items in response to acceptance of the location change by the user.

9. The method of claim 6, wherein the possible function is offered by the electronic device.

10. The method of claim 6, further comprising receiving, at the electronic device, a notification message to indicate that the hierarchy of menu items is to be changed.

11. An apparatus comprising:

one or more processors; and control logic encoded in one or more computer-readable storage media for execution by the one or more processors, and when executed being operable to:

determine user interaction information at an electronic device while a user is using a user interface of the electronic device, the determining occurring independently of whether the device is connected to a network;

store a log of the determined user interaction information in the electronic device;

after a connection between the device and a network is detected, transmit the stored log over the network to a user interface analyzer;

analyze the user interaction information at the user interface analyzer to determine patterns of usage regarding navigating a hierarchy of menu items in the user interface of the electronic device by identifying multiple keystrokes and ascertaining whether the multiple key strokes are associated with a common keystroke sequence, wherein the hierarchy of menu items comprises first and second branches of menu items;

determine at the user interface analyzer a possible function that the user was searching for, the determining of the possible function being based on the analysis of the user interaction information revealing that during a navigation of the first branch of menu items, the user did not select any menu item triggering the possible function, and that during a subsequent navigation of the second branch of menu items, the user did select one menu item in the hierarchy of menu items, the selected item triggering the possible function;

store an analysis result for the determination of the possible function at the user interface analyzer; and use the stored analysis result to change the hierarchy of menu items to facilitate selection of the menu item triggering the possible function, wherein the user interface analyzer sends interface adjustment information to the electronic device over the network to allow the electronic device to change the hierarchy of menu items based on the stored analysis result by changing a location of the menu item triggering the possible function from the second branch of the menu items to the first branch of menu items based on the interface adjustment information.

12. The apparatus of claim 11, wherein the control logic when executed that is operable to analyze further comprises control logic when executed that is operable to:

identify that a first group of the multiple keystrokes occurred during a period of time, defining a first sequence of keystrokes, and that a second group of the multiple keystrokes occurred outside of the period of time, defining a second sequence of keystrokes;

determine the first sequence of keystrokes down the hierarchy of menu items; and determine the second sequence of keystrokes, wherein at least one keystroke in the second sequence is up the hierarchy of menu items, wherein the possible menu item function is determined based on the first sequence and the second sequence.

13. An apparatus comprising:

one or more processors; and control logic encoded in one or more computer-readable storage media for execution by the one or more processors, and when executed being operable to:

determine, at the apparatus, user inputs for a user interface while a user is using the apparatus, the determining occurring independently of whether the apparatus is connected to a network;

store, in the apparatus, a log of user interaction information based on the user inputs;

after a connection between the apparatus and a network is detected, send the stored log of user interaction information over the network to a user interface analyzer to allow the user interface analyzer to analyze the user interaction information to determine patterns of usage regarding navigating a hierarchy of menu items for the user interface of the apparatus by identifying multiple keystrokes and ascertaining whether the multiple key strokes are associated with a common keystroke sequence, wherein the hierarchy of menu items comprises first and second branches of menu items;

receive, at the apparatus, user interface adjustment information sent over the network from the user interface analyzer; and adjust a location of a menu items in the hierarchy of menu items from the second branch to the first branch based on the user interface adjustment information, wherein selection of a possible function that the user was searching for, prior to the adjusting, during a navigation of the first branch of menu items is facilitated by the adjustment of the menu items, wherein the possible function is determined by the analysis of the user interaction information by the user interface analyzer revealing that during the navigation of the first branch of menu items, the user did not select any menu item triggering the possible function, and that during a subsequent navigation of the second branch of menu items, the user did select one menu item in the hierarchy of menu items, the selected item triggering the possible function.

14. The apparatus of claim 13, wherein the user interaction information comprises information for at least one of a first sequence of keystrokes down the hierarchy of menu items and a second sequence of keystrokes, wherein at least one keystroke in the second sequence is up the hierarchy of menu items.

15. The apparatus of claim 13, wherein the interface adjustment information is used by the electronic device to changes a location of a menu item in the hierarchy of menu items in response to acceptance of the location change by the user.

* * * * *